United States Patent
Mistry et al.

(10) Patent No.: US 10,165,227 B2
(45) Date of Patent: Dec. 25, 2018

(54) CONTEXT BASED VIDEO DISTRIBUTION AND STORAGE

(71) Applicant: FutureWei Technologies, Inc., Plano, TX (US)

(72) Inventors: Nalin Mistry, Ottawa (CA); Stephen Collen, Boulder Creek, CA (US); Shree Murthy, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 385 days.

(21) Appl. No.: 14/029,537

(22) Filed: Sep. 17, 2013

(65) Prior Publication Data
US 2014/0267714 A1  Sep. 18, 2014

Related U.S. Application Data

(60) Provisional application No. 61/777,429, filed on Mar. 12, 2013.

(51) Int. Cl.
| | |
|---|---|
| *H04N 7/14* | (2006.01) |
| *H04N 7/18* | (2006.01) |
| *H04N 21/63* | (2011.01) |
| *H04N 21/845* | (2011.01) |

(52) U.S. Cl.
CPC .......... *H04N 7/181* (2013.01); *H04N 21/631* (2013.01); *H04N 21/8451* (2013.01)

(58) Field of Classification Search
None
See application file for complete search history.

(56) References Cited

U.S. PATENT DOCUMENTS

| | | | | | |
|---|---|---|---|---|---|
| 5,892,847 | A | * | 4/1999 | Johnson | H04N 19/30 375/E7.04 |
| 2008/0294789 | A1 | * | 11/2008 | Nassor | H04N 21/23406 709/231 |
| 2009/0034609 | A1 | * | 2/2009 | Peng | H04N 19/105 375/240.01 |
| 2009/0268806 | A1 | * | 10/2009 | Kim | H04N 21/23432 375/240.01 |
| 2012/0155554 | A1 | * | 6/2012 | Magee | H04N 21/23430 375/240.26 |

(Continued)

OTHER PUBLICATIONS

ITU-T Recommendation H.264, "Series H: Audiovisual and Multimedia Systems Infrastructure of audiovisual services—Coding of moving video; Advanced video coding for generic audiovisual services," Apr. 2013, 732 pages.

*Primary Examiner* — James M Anderson, II
(74) *Attorney, Agent, or Firm* — Slater Matsil, LLP

(57) ABSTRACT

The bit-rate of surveillance video streams can be adapted by varying the number of enhancement layers/streams that are transmitted to a local monitoring center and/or data storage center. Enhancement layers that are not transmitted to the local data/monitoring center may be sent to a remote storage location, thereby allowing users to reproduce a high quality version of the surveillance video by retrieving those enhancement layers from the remote storage location. The base and enhancement layers may be obtained by encoding the surveillance video in accordance with a scalable video coding format, such as the H.264/MPEG-4 Advanced video coding (AVC) codec.

25 Claims, 7 Drawing Sheets

(56) References Cited

U.S. PATENT DOCUMENTS

| | | | | |
|---|---|---|---|---|
| 2012/0170523 A1* | 7/2012 | Civanlar | .............. | H04N 21/631 370/329 |
| 2014/0211681 A1* | 7/2014 | Chan | .................. | H04N 21/6405 370/312 |
| 2014/0314393 A1* | 10/2014 | Berger | ............... | H04N 21/4135 386/330 |

* cited by examiner

CONTEXT BASED VIDEO DISTRIBUTION AND STORAGE

This application claims the benefit of U.S. Provisional Application No. 61/777,429 filed on Mar. 12, 2013, entitled "Context based Video Distribution and Storage," which is incorporated herein by reference as if reproduced in its entirety.

TECHNICAL FIELD

The present invention relates to a system and method for video storage, and, in particular embodiments, to a system and method for context based video distribution and storage.

BACKGROUND

Modern video surveillance systems typically include digital cameras configured to communicate digital signals to video servers and monitoring/storage stations. In many systems, the digital video signals are transported over dynamic network environments and/or to diverse destinations. By way of example, video surveillance systems designed to monitor a large campus or compound (e.g., university, etc.) may stream digital video signals from multiple buildings/areas to a central security office. Accordingly, it may be desirable to provide variable bit-rate signals to accommodate changing network environments and/or different end-point devices.

SUMMARY OF THE INVENTION

Technical advantages are generally achieved, by embodiments of this disclosure which describe system and method for context based video distribution and storage.

In accordance with an embodiment, a method for video surveillance is provided. In this example, the method includes obtaining video surveillance content comprising a base layer and a plurality of enhancement layers, sending the base layer over a network to a local data center for on-site storage, and sending a subset of the plurality of enhancement layers to a remote data center for off-site storage. An apparatus for performing this method is also provided.

In accordance with another embodiment, a method for operating a controller in a software defined network is provided. In this example, the method includes sending a first instruction to a video surveillance camera configured to stream video surveillance content comprising a base layer and one or more enhancement layers over a network to an end-point. The first instruction specifies a number of enhancement layers to be streamed to the end-point. The method further includes detecting a triggering condition in the network and sending a second instruction to the video surveillance camera upon detecting the triggering condition. The second instruction specifies a different number of enhancement layers to be streamed to the end-point. An apparatus for performing this method is also provided.

In accordance with yet another embodiment, yet another method for video surveillance is provided. In this example, the method includes obtaining a video surveillance content comprising a base layer and a plurality of enhancement layers, selecting a number of enhancement layers to send to an end point device, and sending the base layer and the subset of enhancement layers over a network to the end-point device. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using embodiments of this disclosure are discussed in detail below. It should be appreciated, however, that aspects of this disclosure provide many applicable inventive concepts that can be embodied in a wide variety of specific contexts. The specific embodiments discussed are merely illustrative of specific ways to make and use the claimed invention, and do not limit the scope of the claimed invention.

Conventional digital video surveillance systems adapt the bit-rate of a video stream by switching from one video codec to another. By way of example, a digital video surveillance camera may switch from a Moving Picture Experts Group (MPEG) video coding format to a Joint Photographic Experts Group (JPEG) video coding format to reduce the bit-rate of an outputted video stream. One drawback to this technique is that switching to a lower quality video coding format may prevent users from retrieving a higher quality version of the surveillance video at a later date.

Aspects of this disclosure adapt the bit-rate of surveillance video streams by varying the number of enhancement layers/streams that are transmitted to a local monitoring center and/or data storage center. In some embodiments, enhancement layers that are not transmitted to the local data/monitoring center may be sent to a remote storage location, thereby allowing users to reproduce a high quality version of the surveillance video by retrieving those enhancement layers from the remote storage location. The base and enhancement layers may be obtained by encoding the surveillance video in accordance with a scalable video coding format, such as the H.264/MPEG-4 Advanced video coding (AVC) codec.

Figure 1:
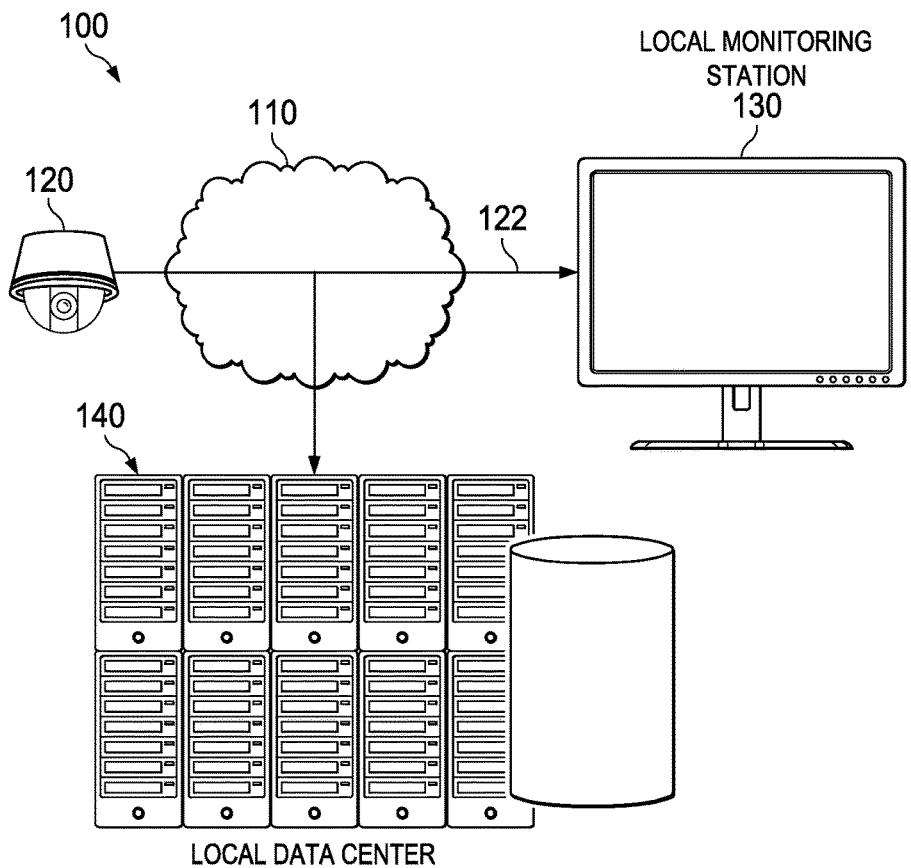
FIG. 1 illustrates a diagram of a conventional video surveillance system.

FIG. 1 illustrates a conventional video surveillance system 100 comprising a local network 110, a video camera 120, a local monitoring station 130, and a local data center 140. As shown, the video camera 120 streams a surveillance video stream 122 over the local network 110 to the local monitoring station 130 and/or local data center 140. The video camera 120 may be configured to vary the bit-rate of the surveillance video stream 122 by switching from one video coding format to another. By way of example, the video camera 120 may switch to a lower quality video format in order to reduce the bit-rate of the surveillance video stream 122 during high traffic periods in the local network 110. As mentioned above, this conventional approach of switching to a lower quality video format may prevent high-quality versions of the surveillance video from being retrieved at a later time.

Figure 2A:
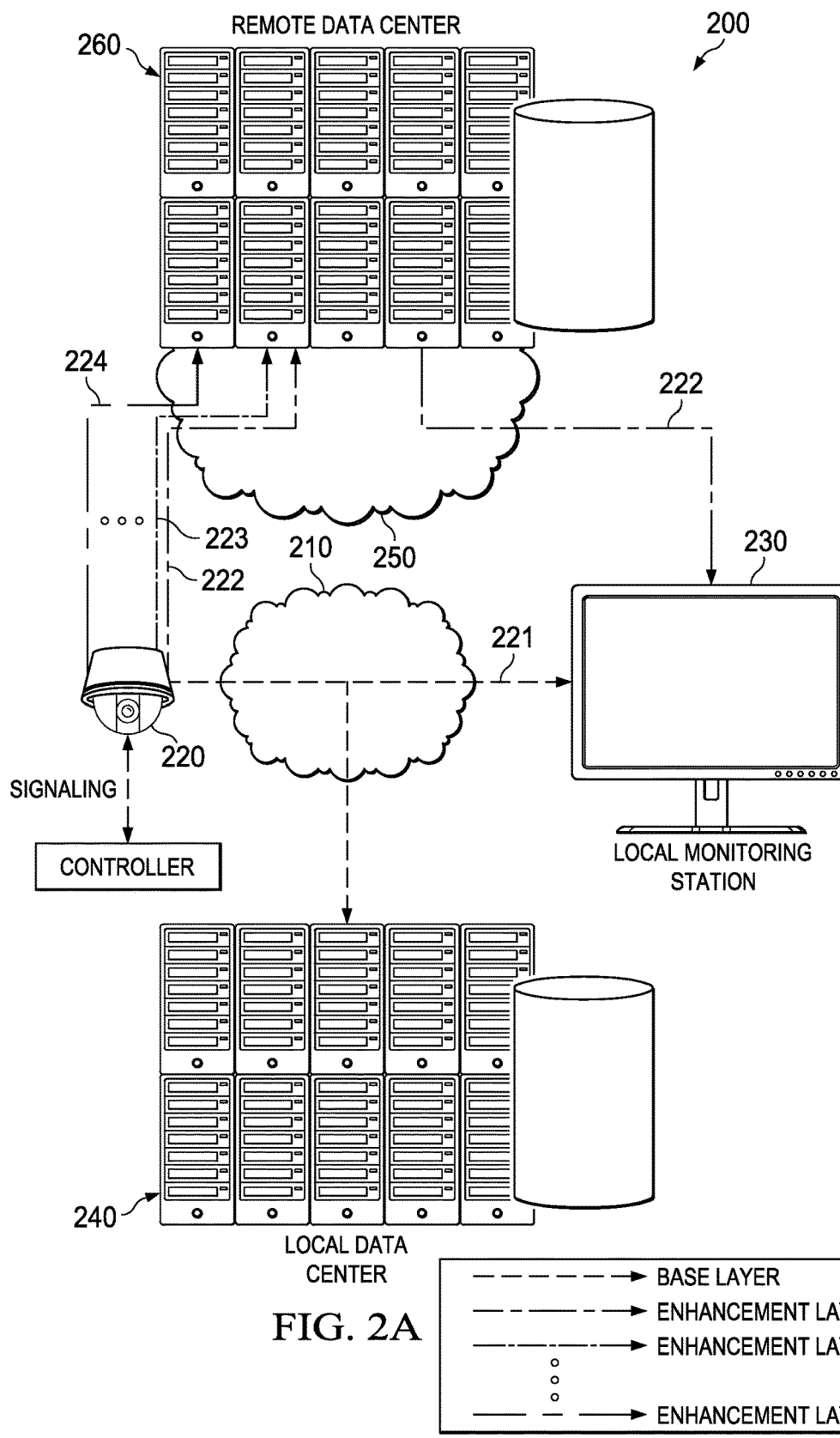
FIGS. 2A-2B illustrate diagrams of an embodiment video surveillance system.
Figure 2B:
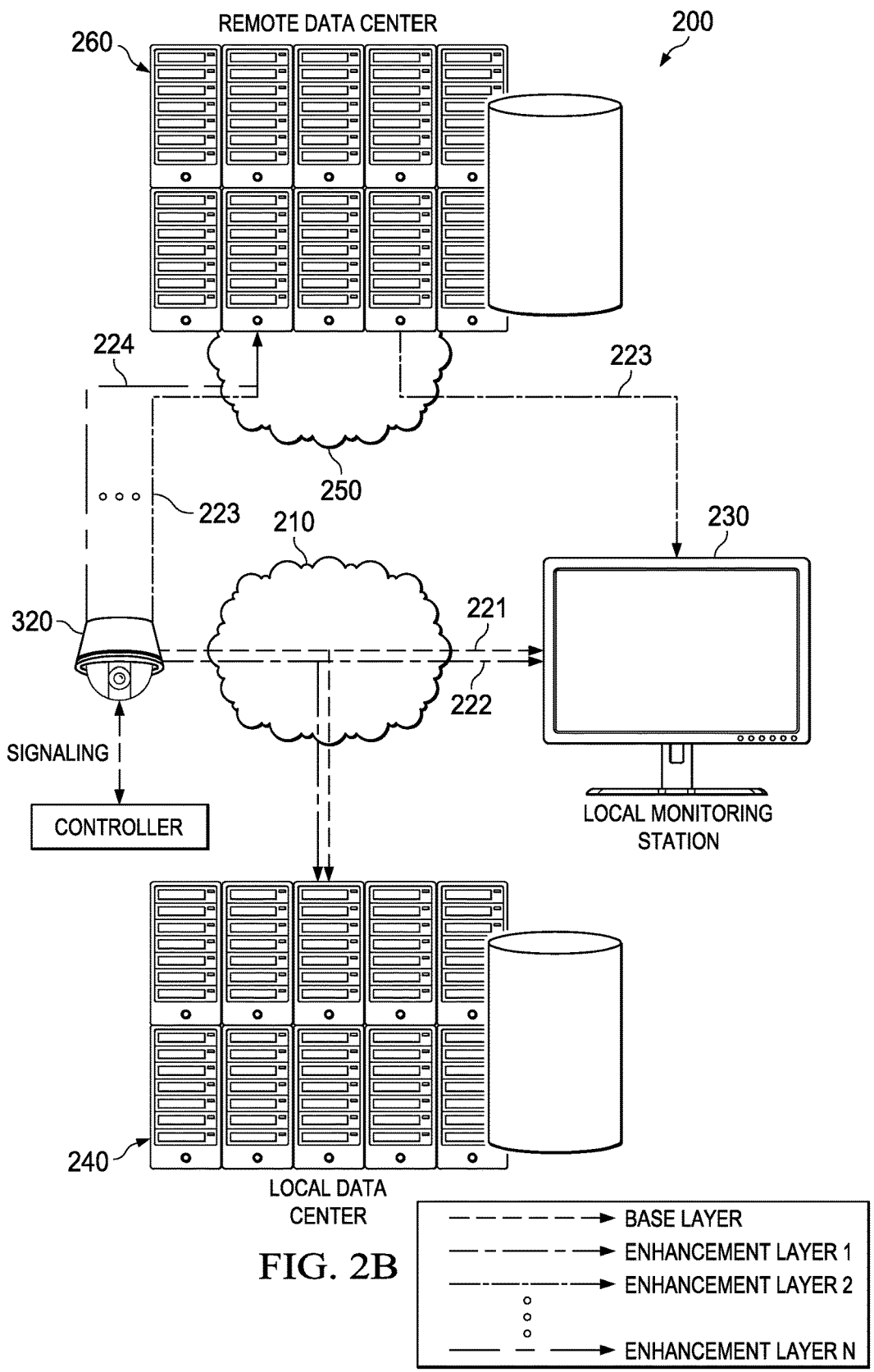

Embodiments of this disclosure adapt the bit-rate of surveillance video streams by varying the number of enhancement layers/streams that are transmitted to a local data/monitoring center. In some embodiments, some or all of the enhancement layers/streams may be stored in a remote data center, thereby allowing the bit-rate of the surveillance video stream provided over the local network to be adapted/reduced while maintaining the ability to retrieve higher-quality versions of the surveillance video at a later date. FIGS. 2A-2B illustrate an embodiment video surveillance system 200 comprising a local network 210, a video camera 220, a local monitoring station 230, a local data center 240, a network 250, and a remote data center 260. The video camera 220 may be configured to encode a surveillance video into a base layer 221 and a plurality of enhancement layers 222-224 using a scalable video encoding format, e.g., H.264/MPEG-4 AVC video codec. The layers 221-224 may be combined to generate different quality versions of the surveillance video. For example, a low quality version of the surveillance video may be generated by decoding the base layer 221. Higher quality versions of the surveillance video may be generated by decoding the base layer 221 along with one or more of the enhancement layers 222-224.

The video camera 220 may be further configured to adapt a bit-rate of the surveillance video stream by sending different numbers of enhancement layers 222-224 over the local network 210. FIG. 2A depicts how the video camera 220 achieves a lowest bit-rate surveillance video stream by transmitting the base layer 221 over the network without transmitting any of the enhancement layers 222-224 over the local network 210. FIG. 2B depicts how the video camera 220 achieves a higher bit-rate surveillance video stream by transmitting the base layer 221 and one or more of the enhancement layers 222-224 over the local network 210.

Enhancement layers 222-224 that are not sent over the local network 210 may be forwarded over the network 250 to a remote data center 260 for off-site storage. The remote data center 260 may represent an offsite storage location, e.g., a cloud server, etc. The network 250 may be separate from the local network 210. For example, the network 250 may be an internet protocol (IP) network, e.g., the world-wide-web, etc. The video camera 220 may send content over the network 250 using the same or different interfaces as the local network 210.

Figure 3:
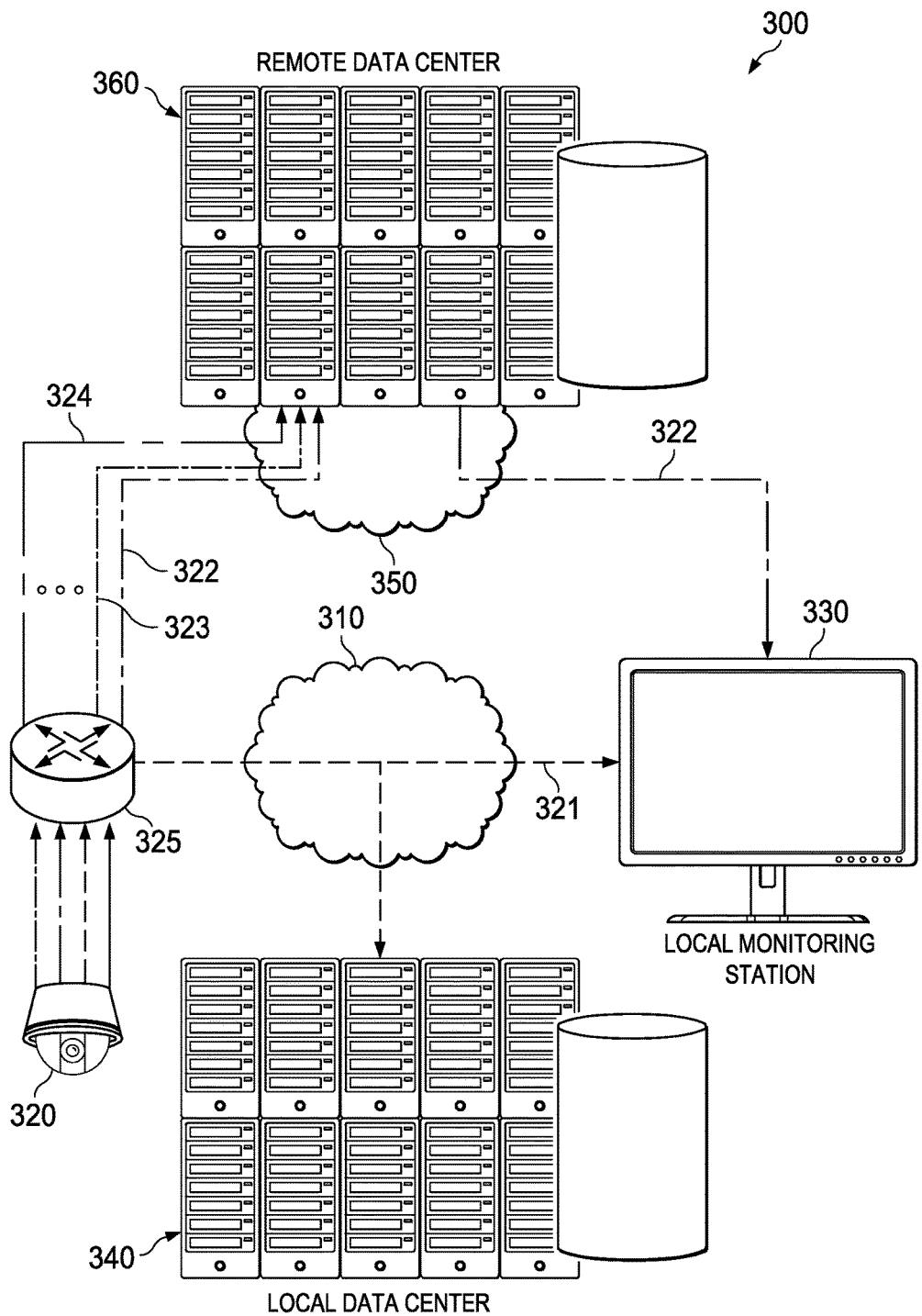
FIG. 3 illustrates a diagram of another embodiment video surveillance system.

The description of the embodiment video surveillance system 200 suggests that the smart-streaming decisions are made by the video camera 220. However, in some embodiments, the smart-streaming decisions may be made by another device, such as a different piece of surveillance equipment or by a software defined network. FIG. 3 illustrates an embodiment video surveillance system 300 comprising a local network 310, a video camera 320, a video surveillance equipment 325, a local monitoring station 330, a local data center 340, a network 350, and a remote data center 360. The video surveillance equipment 325 may be any type of surveillance equipment, such as a router, a switch, a server, or any other type of networking device. The video camera 320 may be configured to encode a surveillance video to obtain a base layer 321 and a plurality of enhancement layers 322-324 using a scalable video encoding format, and to forward each of the streams 321-324 to the video surveillance equipment 325. The video surveillance equipment 325 may be configured to determine which of the enhancement layers 322-324 to forward the over the local network 310. The video surveillance equipment 325 may forward any enhancement layers 322-324 not streamed over the local network 310 to the remote datacenter 360 via the network 350.

Figure 4:
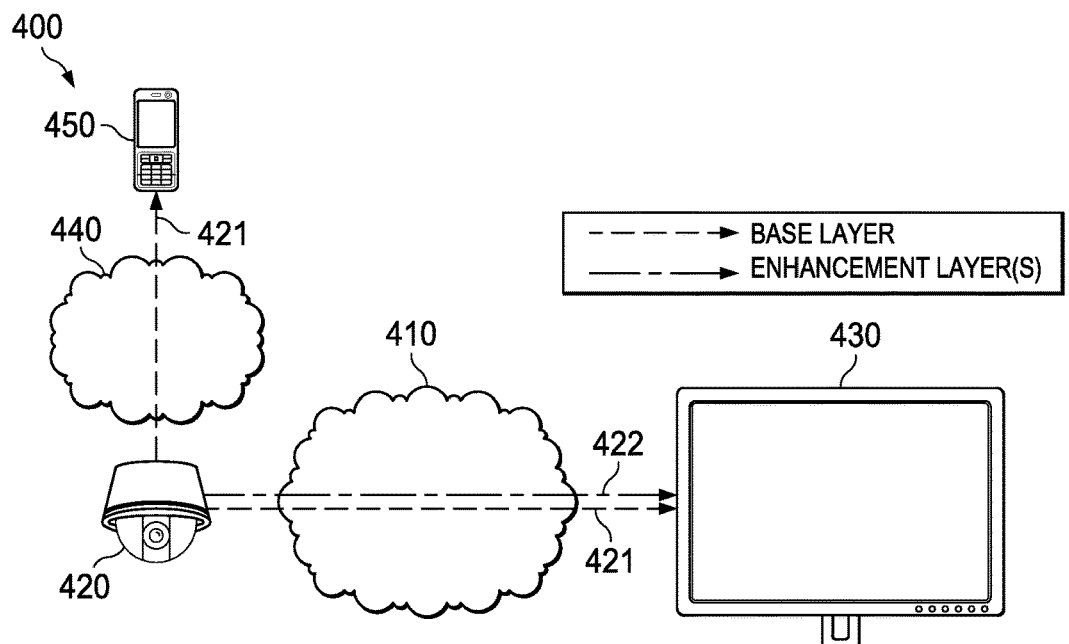
FIG. 4 illustrates a diagram of yet another embodiment video surveillance system.

In some embodiments, different numbers of enhancement layers may be provided depending on characteristics of end-point devices and/or the networks over which the video surveillance content is streamed. FIG. 4 illustrates an embodiment video surveillance system 400 in which a video camera 420 sends surveillance video streams to a first device 430 and a second device 450. As shown, the video camera 420 sends a base layer 421 and an enhancement layer 422 to the first device 430, while only sending the base layer 421 to the device 450. The decisions as to whether or not to send the enhancement layer 422 with the base layer 421 may be based on characteristics of the devices 430,450 and/or characteristics of the networks 410, 440. The characteristic of the devices 430, 450 may include any parameter associated with the devices 430, 450 (or a user thereof), such as a display size, subscription level, service level agreement (SLA), etc. For example, the video camera 420 may send the enhancement layer 422 to the first device 430, but not to the second device 450, when the first device 430 has a better SLA/subscription-level than the second device 450, e.g., the device 430 is a gold user and the device 450 is a bronze user. As another example, the enhancement layer 422 may be sent to the first device 430, but not to the second device 450, when the first device 430 has a larger screen than the second device 450. The characteristic of the networks 410, 440 may include any characteristic or quality of the networks 410, 440, such as a network type (e.g., wireless or wireline environment), a quality of service (QoS) parameter (e.g., latency, congestion level, bit-error rate, etc.), or channel quality parameter (e.g., fading, path loss, etc.). For example, the video camera 420 may send the enhancement layer 422 to the first device 430, but not to the second device 450, when the network 410 has a higher quality than the network 440, e.g., the network 410 is a wireline network and the network 440 is a wireless network, the network 410 provides a higher bit-rate or lower latency than the network 440, etc.

There are several factors that allow for increased flexibility and control in IP video management systems. One such factor is that a wide variety of IP camera types exist, ranging from those costing less than $100 to those costing more than $5,000. Differences may be mainly attributed to the features included in the camera, such as high resolutions, pan-tilt-zoom (PTZ control), onboard memory, onboard compute for analytics, type of network connectivity, I/O support and codec types (ex. JPEG, MPEG-4, H.264) supported. Another factor is network connectivity, as IP signals can span Ethernet, xDSL, WiFi and Cellular connections. The network can be shared or dedicated. In some environments, network oversubscription can occur. Another factor is congestion detection, as real time transport protocol (RTP) has built in notification mechanisms to provide endpoints on end-to-end health of the session.

Aspects of this disclosure provide mechanisms for scaling service level agreements (SLAs) during network degradation by leveraging H.264 capabilities. More specifically, aspects of this disclosure may adapt properties of a video stream across a network (e.g., a wide area network (WAN) and/or cellular network) in accordance with network capacity, end point characteristics, and/or other criteria. For instance, aspects of this disclosure may adapt the video stream in accordance with changing network conditions, as may be common in shared networks, oversubscribed access networks, and cellular networks. Further, aspects of this disclosure may provide graceful degradation of video stream quality under adverse network conditions. For example, cellular coverage resulting in lower bandwidth.

In embodiments, IP based video surveillance systems may use IP/user datagram protocol (UDP)/real-time transport protocol (RTP) based protocols for video transmission. Many advances have been made in video coding, such as the advances in Scalable Video Coding (SVC) as defined in Annex G extension to H.264/MPEG-4 AVC encoding, which is incorporated by reference herein as if reproduced in its entirety. Such advances may enable high quality video to be broken down into one or more subset bit streams, such as a base layer bit stream and one or more enhancement layer bit-streams.

The inherent property of the video streams may be used to achieve more scalable and context-adaptable distribution/storage. The different streams (base and the enhancement layers) can be delivered to the storage systems based on the context associated with the end-point (the device which generates the video streams), the context of the network in which the streams are being transmitted and the context associated with the target device on which these streams are being stored.

Aspects of this disclosure provide the following benefits: consistent user experience under conditions of degraded or variable bandwidth; improved return on investment (ROI) of customer's network and video infrastructure; improved security as "mission critical" video can be routed and stored according to the customer's business policies; appropriate prioritization, routing and storage of video traffic to meet customer's commercial and financial goals.

As stated earlier, analog video surveillance systems are closed network systems, with network connectivity that is dedicated and engineered to meet deployment requirements. Many cameras support H.246 encoding formats, with higher end cameras also including onboard memory and processors for analytics. What they lack is the ability to adapt to the dynamic network conditions and graceful degradation under adverse network conditions.

Aspects of this disclosure are applicable to cloud-based video surveillance, known as Video Surveillance as a Service (VSaaS). According to aspects of this disclosure, high quality video bit-stream is converted into one or more subset bit-streams including a base layer and/or enhancement layer. Aspects of this disclosure can be adapted to suit different network requirements, and may offer the capability to gracefully degrade a signal (rather than a binary on or off). Aspects of this disclosure may be applicable to source tuning with Direct Monitoring as well as event based source tuning.

Figure 5:
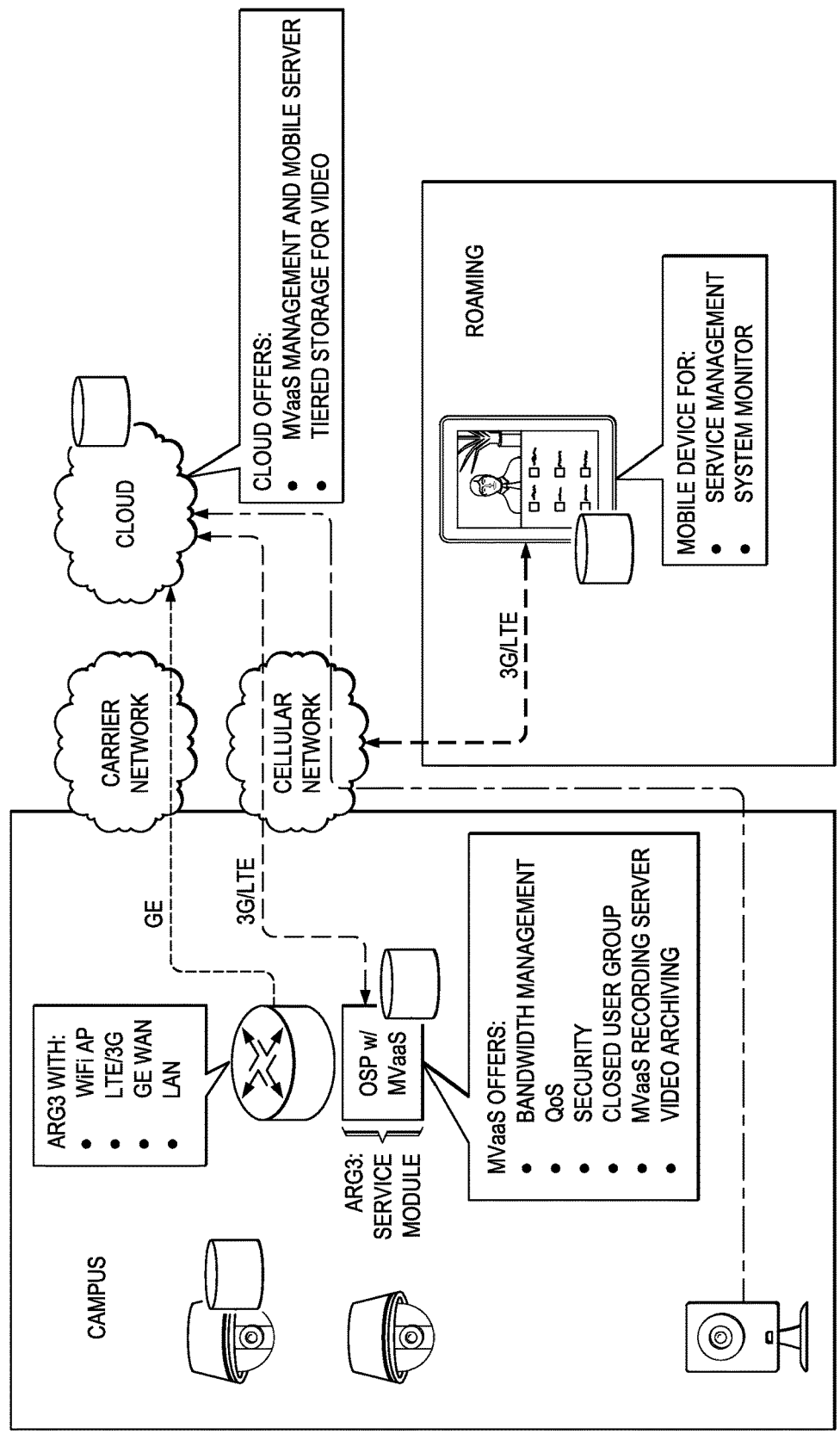
FIG. 5 illustrates a diagram of yet another embodiment video surveillance system.
Figure 6:
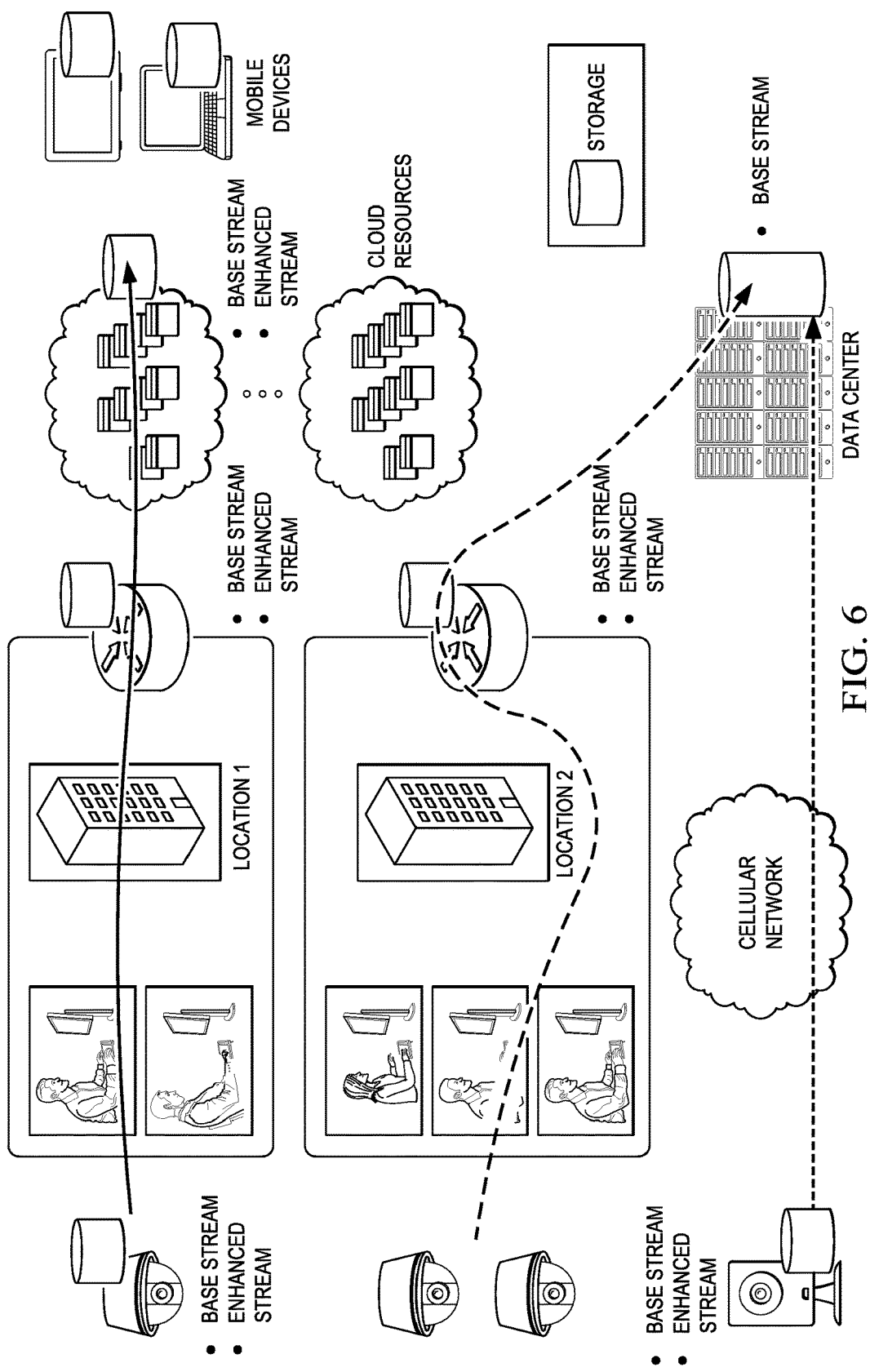
FIG. 6 illustrates a diagram of yet another embodiment video surveillance system.

In an embodiment, a video stream is generated by a source. The video stream is then adapted by the source (or by a distributed network element) based on a characteristic of the network. In some embodiments, the characteristic of the network is communicated by a controller. The controller may be monitoring parameters of the network, and may direct either the source or distributed network element(s) to adapt the video stream in accordance with the monitored parameters. In other embodiments, the source or network element may decide when or how to adapt the video stream based on a triggering event, e.g., a network node/link failure or congestion, etc. FIGS. 5 and 6 illustrate examples of IP surveillance network architectures.

Figure 7:
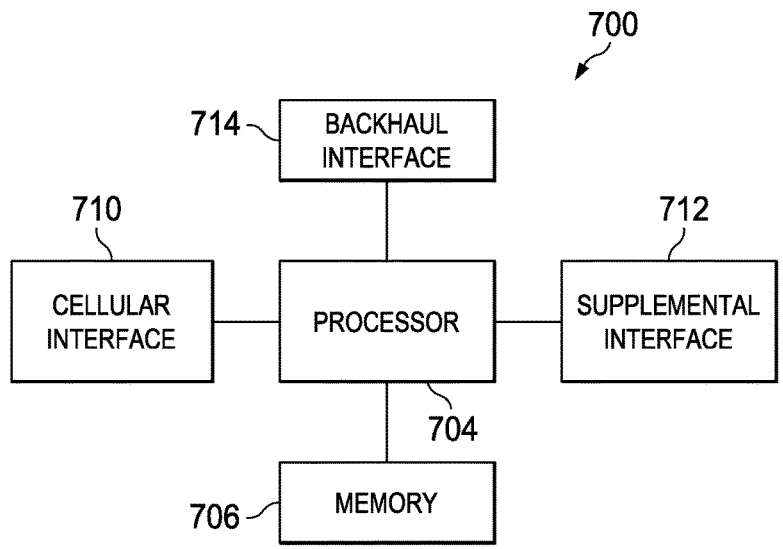
FIG. 7 illustrates a block diagram of an embodiment of a communications device.

FIG. 7 illustrates a block diagram of an embodiment of a communications device 700, which may be equivalent to one or more devices (e.g., UEs, NBs, etc.) discussed above. The communications device 700 may include a processor 704, a memory 706, a cellular interface 710, a supplemental interface 712, and a backhaul interface 714, which may (or may not) be arranged as shown in FIG. 7. The processor 704 may be any component capable of performing computations and/or other processing related tasks, and the memory 706 may be any component capable of storing programming and/or instructions for the processor 704. The cellular interface 710 may be any component or collection of components that allows the communications device 700 to communicate using a cellular signal, and may be used to receive and/or transmit information over a cellular connection of a cellular network. The supplemental interface 712 may be any component or collection of components that allows the communications device 700 to communicate data or control information via a supplemental protocol. For instance, the supplemental interface 712 may be a non-cellular wireless interface for communicating in accordance with a Wireless-Fidelity (Wi-Fi) or Bluetooth protocol. Alternatively, the supplemental interface 712 may be a wireline interface. The backhaul interface 714 may be optionally included in the communications device 700, and may comprise any component or collection of components that allows the communications device 700 to communicate with another device via a backhaul network.

Figure 8:
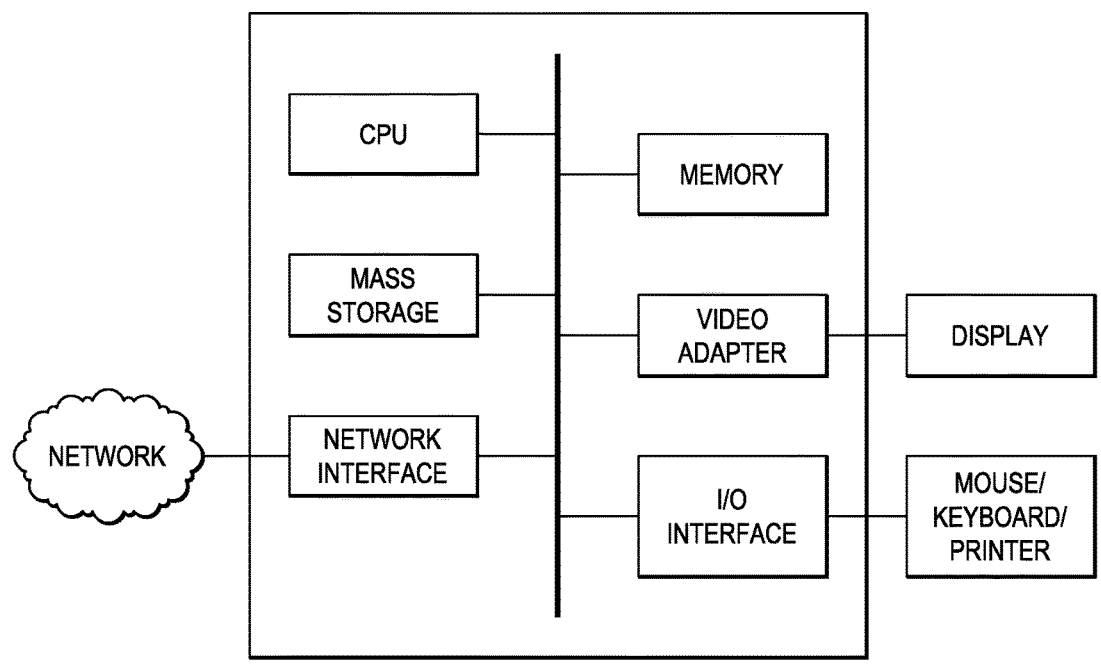
FIG. 8 illustrates a block diagram of an embodiment processing system.

FIG. 8 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for video surveillance, the method comprising:
    obtaining, by a surveillance equipment, video surveillance content comprising a base layer and enhancement layers;
    selecting, by the surveillance equipment, a number of enhancement layers for on-site storage in accordance with a characteristic of a local network, a local data center, a remote data center, or combinations thereof, thereby adapting a bit-rate of the video surveillance content, the number of enhancement layers selected for on-site storage being an integer that is greater than or equal to one, wherein the number of enhancement layers selected for on-site storage includes fewer than all of the enhancement layers such that at least one of the enhancement layers is not selected for on-site storage;
    sending, by the surveillance equipment, the base layer and the number of enhancement layers selected for on-site storage over the local network to the local data center for on-site storage, the local network connecting the surveillance equipment to the local data center; and
    sending, by the surveillance equipment, the at least one enhancement layer that was not selected for on-site storage to a remote data center for off-site storage without communicating the at least one enhancement layer over the local network to the local data center, the at least one enhancement layer not having been stored on-site in the local data center prior to being sent to the remote data center for off-site storage.

2. The method of claim 1, wherein a low quality version of the video surveillance content is configured to be viewed by retrieving the base layer from the local data center.

3. The method of claim 1, wherein a high quality version of the video surveillance content is configured to be viewed by retrieving the base layer and at least a first enhancement layer from the local data center and by retrieving at least a second enhancement layer from the remote data center.

4. The method of claim 1, wherein the characteristic comprises an amount of available network bandwidth in the local network, and wherein fewer enhancement layers are selected for on-site storage when less bandwidth is available in the local network.

5. The method of claim 1, wherein the characteristic comprises a quality of a network connection between the surveillance equipment and the local data center.

6. The method of claim 1, wherein the characteristic comprises a proximity of the surveillance equipment to the local data center.

7. The method of claim 1, wherein the surveillance equipment comprises a video surveillance camera.

8. The method of claim 1, wherein the surveillance equipment comprises a router configured to receive video surveillance content from a video surveillance camera.

9. A surveillance equipment comprising:
    a processor; and
    a non-transitory computer readable storage medium storing programming for execution by the processor, the programming including instructions to:
    obtain video surveillance content comprising a base layer and enhancement layers;
    select a number of enhancement layers for on-site storage in accordance with a characteristic of a local network, a local data center, a remote data center, or combinations thereof, thereby adapting a bit-rate of the video surveillance content, the number of enhancement layers selected for on-site storage being an integer that is greater than or equal to one, wherein the number of enhancement layers selected for on-site storage includes fewer than all of the enhancement layers such that at least one of the enhancement layers is not selected for on-site storage;
    send the base layer and the number of enhancement layers selected for on-site storage over the local network to the local data center for on-site storage, the local network connecting the surveillance equipment to the local data center; and
    send the at least one enhancement layer that was not selected for on-site storage to a remote data center for off-site storage without communicating the at least one enhancement layer over the local network to the local data center, the at least one enhancement layer not having been stored on-site in the local data center prior to being sent to the remote data center for off-site storage.

10. The surveillance equipment of claim 9, wherein a low quality version of the video surveillance content is configured to be viewed by retrieving the base layer from the local data center.

11. The surveillance equipment of claim 9, wherein a high quality version of the video surveillance content is configured to be viewed by retrieving the base layer and at least a first enhancement layer from the local data center and by retrieving at least a second enhancement layer from the remote data center.

12. A controller in a software defined network environment, the controller comprising:
    a processor; and
    a non-transitory computer readable storage medium storing programming for execution by a processor, the programming including instructions to:
    send a first instruction to a video surveillance camera configured to stream live video surveillance content over a network connection between the video surveillance camera and an end-point, the live video surveillance content comprising a base layer and one or more enhancement layers, wherein the first instruction instructs the video surveillance camera to send a number of enhancement layers along with the base layer to the end-point while streaming the live video surveillance content;

detect a change in a condition of the network connection; and send a second instruction to the video surveillance camera upon detecting the change in the condition of the network connection, wherein the second instruction instructs the video surveillance camera to adapt the bit-rate of the live video surveillance content being streamed over the network connection by sending a different number of enhancement layers along with the base layer over the network connection between the video surveillance camera and the end-point without interrupting the streaming of the live video surveillance content to the end-point, wherein enhancement layers accompanying a corresponding base layer correspond to the same portion of the live video surveillance content as the corresponding base layer.

13. The controller of claim 12, wherein the change in the condition of the network condition is detected when a bit-rate parameter of the network connection has changed by a threshold amount.

14. The controller of claim 12, wherein the change in the condition of the network condition is detected when a latency parameter of the network connection has changed by a threshold amount.

15. The controller of claim 12, wherein the change in the condition of the network condition is detected when a congestion parameter of the network connection has changed by a threshold amount.

16. A method comprising:

sending a first instruction to a video surveillance camera configured to stream live video surveillance content over a network connection between the video surveillance camera and an end-point, the live video surveillance content comprising a base layer and one or more enhancement layers, wherein the first instruction instructs the video surveillance camera to send a number of enhancement layers along with the base layer to the end-point while streaming the live video surveillance content;

detecting a change in a condition of the network connection; and sending a second instruction to the video surveillance camera upon detecting the change in the condition of the network connection, wherein the second instruction instructs the video surveillance camera to adapt the bit-rate of the live video surveillance content being streamed over the network connection by sending a different number of enhancement layers along with the base layer over the network connection between the video surveillance camera and the end-point without interrupting the streaming of the live video surveillance content to the end-point, wherein enhancement layers accompanying a corresponding base layer correspond to the same portion of the live video surveillance content as the corresponding base layer.

17. The method of claim 16, wherein the change in the condition of the network condition is detected when a bit-rate parameter of the network connection has changed by a threshold amount.

18. The method of claim 16, wherein the change in the condition of the network condition is detected when a latency parameter of the network connection has changed by a threshold amount.

19. The method of claim 16, wherein the change in the condition of the network condition is detected when a congestion parameter of the network connection has changed by a threshold amount.

20. The surveillance equipment of claim 9, wherein the characteristic comprises a quality of a network connection between the surveillance equipment and the local data center.

21. The surveillance equipment of claim 9, wherein the characteristic comprises a proximity of the surveillance equipment to the local data center.

22. The surveillance equipment of claim 9, wherein the characteristic comprises an amount of available network bandwidth in the local network, and wherein fewer enhancement layers are selected for on-site storage when less bandwidth is available in the local network.

23. The surveillance equipment of claim 9, wherein the surveillance equipment comprises a video surveillance camera.

24. The surveillance equipment of claim 9, wherein the surveillance equipment comprises a router configured to receive video surveillance content from a video surveillance camera.

25. The method of claim 1, wherein the number of enhancement layers selected for on-site storage consists of a single enhancement layer.

* * * * *